(12) United States Patent
Cerny et al.

(10) Patent No.: US 10,126,062 B2
(45) Date of Patent: Nov. 13, 2018

(54) HEAT EXCHANGER FOR EMBEDDED ENGINE APPLICATIONS

(71) Applicant: General Electric Company, Schenectady, NY (US)

(72) Inventors: Matthew Robert Cerny, West Chester, OH (US); Jeffrey Raymond Menard, Cincinnati, OH (US); Thomas Kupiszewski, Liberty Township, OH (US); Johnathen Pegram, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 14/990,884

(22) Filed: Jan. 8, 2016

(65) Prior Publication Data
US 2017/0198974 A1   Jul. 13, 2017

(51) Int. Cl.
*F28F 3/00* (2006.01)
*F28D 1/02* (2006.01)
(Continued)

(52) U.S. Cl.
CPC ............. *F28D 1/024* (2013.01); *F01D 25/12* (2013.01); *F02C 7/141* (2013.01); *F02C 7/185* (2013.01); *F28D 1/047* (2013.01); *F28D 9/0012* (2013.01); *F28D 9/0018* (2013.01); *F28F 9/026* (2013.01); *F28F 9/0221* (2013.01);
(Continued)

(58) Field of Classification Search
CPC ...... F28D 7/163; F28D 9/0012; F28D 7/1692;
F28D 9/0018; F28D 2021/0021; F28D 2021/0026; F28F 9/026; F02C 7/185; F02C 7/141; F02C 9/18; F02C 9/52;
(Continued)

(56) References Cited

U.S. PATENT DOCUMENTS 2,479,071 A    8/1949  Henstridge
3,033,534 A *  5/1962  Caughill ............... F28D 9/00
                                                    165/145
(Continued)

FOREIGN PATENT DOCUMENTS

CA   2 895 602 A1   12/2015
EP     2620618 A2    7/2013
(Continued)

OTHER PUBLICATIONS

"Heat Exchangers," Reaction Engines Ltd., United Kingdom, 2015, http://www.reactionengines.co.uk/heatex.html.
(Continued)

*Primary Examiner* — Len Tran
*Assistant Examiner* — Jose O Class-Quinones
(74) *Attorney, Agent, or Firm* — General Electric Company; Brian Overbeck

(57) ABSTRACT

An annular heat exchanger for a gas turbine engine is provided. The annular heat exchanger can include a first annular ring comprising a first main tube defined by a plurality of transduct segments; a second annular ring comprising a second main tube defined by a plurality of transduct segments and a curvilinear plate defining at least one channel therein that is in fluid communication with a transduct segment of the first main tube and a transduct segment of the second main tube.

19 Claims, 13 Drawing Sheets

(51) Int. Cl.
*F02C 7/18* (2006.01)
*F28D 1/047* (2006.01)
*F01D 25/12* (2006.01)
*F02C 7/141* (2006.01)
*F28F 9/02* (2006.01)
*F28D 9/00* (2006.01)
*F28D 21/00* (2006.01)

(52) U.S. Cl.
CPC ...... *F05D 2230/31* (2013.01); *F05D 2230/51* (2013.01); *F05D 2300/175* (2013.01); *F28D 2021/0021* (2013.01); *F28D 2021/0026* (2013.01); *Y02T 50/675* (2013.01)

(58) Field of Classification Search
CPC ...... F02C 7/047; F01D 25/12; F05D 2230/51; B64D 15/02; B64D 2033/0233; B64D 2033/024
USPC .............. 165/DIG. 16, DIG. 303, DIG. 332, 165/DIG. 338
See application file for complete search history.

(56) References Cited

U.S. PATENT DOCUMENTS

| | | | |
|---|---|---|---|
| 3,255,818 A * | 6/1966 | Beam, Jr. | F02G 5/02 165/166 |
| 3,289,757 A * | 12/1966 | Rutledge | F25J 3/04412 165/166 |
| 4,086,910 A | 5/1978 | Rowland | |
| 4,438,809 A | 3/1984 | Papis | |
| 4,513,807 A | 4/1985 | Rose et al. | |
| 5,004,044 A | 4/1991 | Horgan et al. | |
| 6,435,816 B1 * | 8/2002 | Czachor | F01D 5/081 415/116 |
| 6,460,353 B2 | 10/2002 | Udobot et al. | |
| 8,132,408 B2 | 3/2012 | Li et al. | |
| 8,387,362 B2 | 3/2013 | Storage et al. | |
| 8,763,363 B2 | 7/2014 | Ranganathan | |
| 8,919,426 B2 | 12/2014 | Hardesty | |
| 2009/0101308 A1 | 4/2009 | Hardesty | |
| 2010/0139900 A1 | 6/2010 | Thompson | |
| 2011/0302928 A1 | 12/2011 | Mudawar | |
| 2013/0186102 A1 | 7/2013 | Lo | |
| 2013/0236299 A1 | 9/2013 | Kington et al. | |
| 2017/0198637 A1 | 7/2017 | Cerny et al. | |
| 2017/0198719 A1 | 7/2017 | Cerny et al. | |

FOREIGN PATENT DOCUMENTS

| | | |
|---|---|---|
| EP | 2 696 056 A2 | 2/2014 |
| FR | 1 038 859 A | 10/1953 |
| WO | WO 2015/160403 A2 | 10/2015 |

OTHER PUBLICATIONS

"How Heat Exchangers Work," Reaction Engines Ltd., United Kingdom, 2015, http://www.reactionengines.co.uk/heatex_work.html.

"Liquid Hydrogen as Propulsion Fuel," Part II: 1950-1957, The Model 304 Engine, Pratt & Whitney, http://history.nasa.gov/SP-4404/ch8-9.htm.

Extended European Search Report and Opinion issued in connection with corresponding EP Application No. 16197770.7 dated May 19, 2017.

Office Action issued in connection with corresponding EP Application No. 16197770.7 dated Jun. 6, 2017.

* cited by examiner

HEAT EXCHANGER FOR EMBEDDED ENGINE APPLICATIONS

FEDERALLY SPONSORED RESEARCH

This invention was made with government support under contract number N00014-10-D-0010 of the Department of the Navy. The government may have certain rights in the invention.

FIELD OF THE INVENTION

The present invention relates generally to gas turbine engines and, more particularly, to a heat exchange arrangement in a fan duct of a gas turbine engine for cooling high pressure hot bleed air.

BACKGROUND OF THE INVENTION

Many commercial aircraft gas turbine engines employ high pressure hot air bled from the core engine compressor for use by different systems on the aircraft. In particular, the high pressure air is required by a variety of tasks on the aircraft, such as anti-icing and passenger cabin cooling. However, prior to use of the air, the temperature of the air must be lowered to reasonable levels in accordance with the requirements of each specific task.

One current method of cooling the high pressure compressor bleed air is to extract or bleed air from the engine fan duct imbedded within the engine case. The cooler bleed air from the fan duct and the high pressure hotter bleed air from the core engine compressor are then passed through a heat exchanger where the hotter high pressure air gives up some of its thermal energy to the cooler fan duct bleed air.

Use of the heat exchange process is necessary, although, current systems for attaining heat transfers are unduly complex. In one system, an elaborate layout of piping is employed to pass the high pressure bleed air to the aircraft and to route the cooler fan duct bleed air to the location of the heat exchanger. By the time the cooler fan duct bleed air reaches the heat exchanger and performs its cooling task, it has lost most of its pressure (thrust potential) due to frictional losses because of various bends and turns of the piping. After exiting from the heat exchanger, the fan duct bleed air is discharged overboard from the aircraft structure with a negligible thrust benefit. The impact of the fan duct bleed air thrust loss on engine specific fuel consumption is significant. Furthermore, the excessively complex bleed air piping adds significantly to the aircraft weight.

Consequently, a need still remains for improvements in the arrangement for performing heat transfer operations which will avoid the fan duct bleed air loss experienced by the prior art.

BRIEF DESCRIPTION OF THE INVENTION

Aspects and advantages of the invention will be set forth in part in the following description, or may be obvious from the description, or may be learned through practice of the invention.

A curvilinear plate is generally provided. In one embodiment, the curvilinear plate includes an inner plate defining a plurality of first grooves and an outer plate defining a plurality of second grooves. The outer plate is attached to the inner plate with the plurality of first grooves and the plurality of second grooves substantially aligned to define a plurality of channels therebetween. Each channel extends from a first opening on a first portion of a first end of the curvilinear plate to a second opening on a second portion of the first end.

A method is also generally provided for forming a curvilinear plate. In one embodiment, the method includes stamping a first sheet of metal to form a first plate defining a plurality of first grooves; stamping a second sheet of metal to form a second plate defining a plurality of second grooves; and thereafter, laminating the first sheet to the second sheet to form the curvilinear plate such that the plurality of first grooves and the plurality of second grooves substantially aligned to define a plurality of channels therebetween. Each channel extends from a first opening on a first portion of a first end of the curvilinear plate, through a curve defined in each channel, and to a second opening on a second portion of the first end.

A transduct segment is also generally provided. In one embodiment, the transduct segment includes a main tube extending from a first end to a second end and defining a hollow passageway therethrough, a lower platform attached to an outer surface of the main tube on first side of an aperture defined within the main tube, and an upper platform attached to the outer surface of the main tube on second side of the aperture that is opposite of the first side. The upper platform is integral with the lower platform to define a supply channel therebetween, and the supply channel is in fluid communication with the hollow passageway of the main tube through the aperture defined by the main tube. The lower platform and the upper platform define an interface defining a plurality of channels in fluid communication with the hollow passageway defined by the main tube.

In one embodiment, an annular heat exchanger is generally provided for a gas turbine engine. The annular heat exchanger can include a first annular ring comprising a first main tube defined by a plurality of transduct segments; a second annular ring comprising a second main tube defined by a plurality of transduct segments (such as described above) and a curvilinear plate defining at least one channel therein that is in fluid communication with a transduct segment of the first main tube and a transduct segment of the second main tube.

Methods are also generally provided of cooling a hot fluid in an annular duct of a gas turbine engine. In one embodiment, the method includes directing the hot fluid through a plurality of cooling channels that are radially layered within the annular duct to define a heat transfer area, and passing a cooling fluid through the annular duct such that the cooling fluid passes between the radially layered cooling channels. Additionally or alternatively, the method can include directing the hot fluid through a plurality of cooling channels that are radially layered within the annular duct to define a heat transfer area, and passing a cooling fluid through the annular duct such that the cooling fluid passes between the radially layered cooling channels. Additionally or alternatively, the method can include passing the hot fluid into a first inner radial tube, through a plurality of cooling channels defined within a plurality of curvilinear plates that are radially layered within the annular duct, and into a second inner radial tube; and passing a cooling fluid through the annular duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
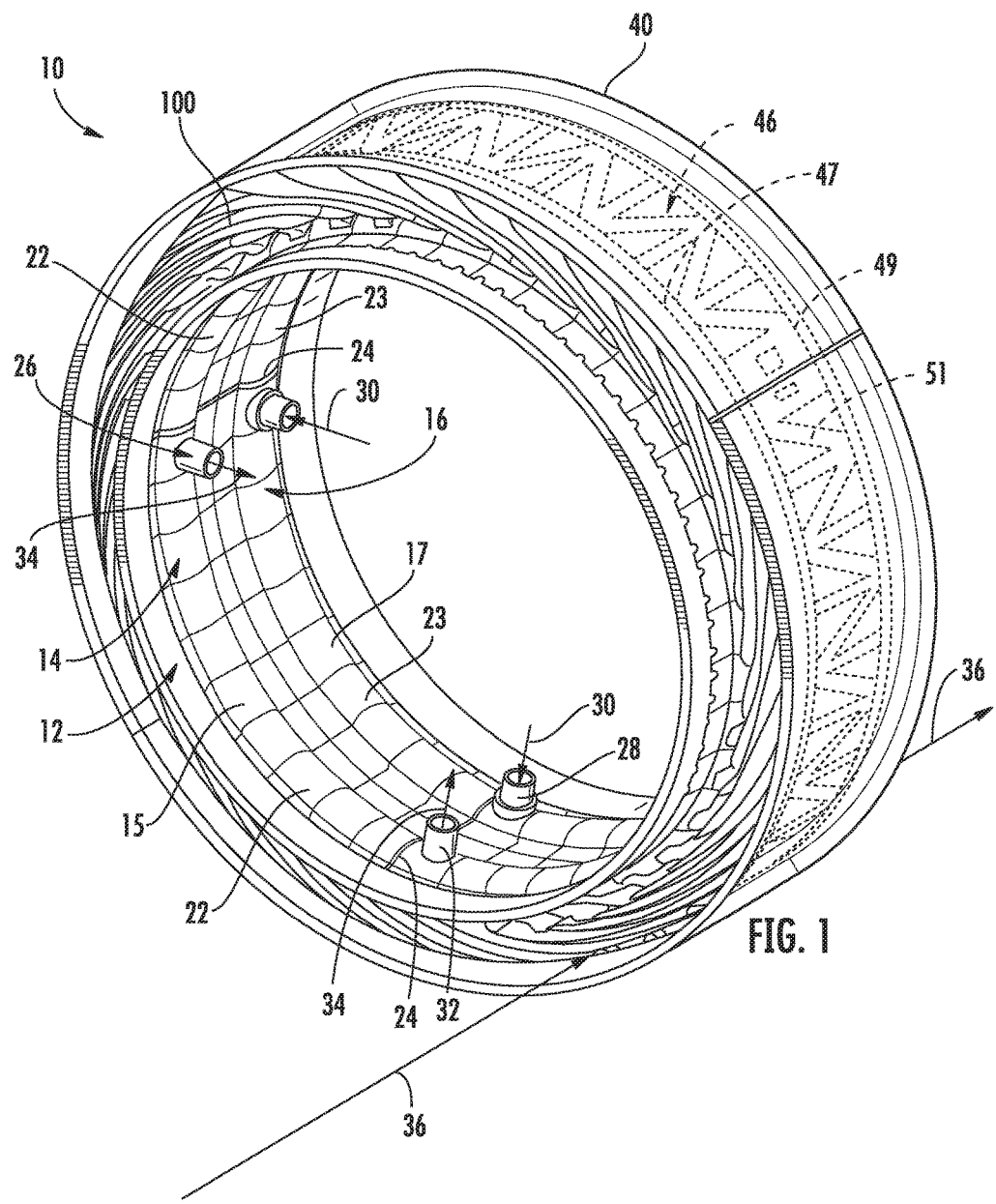
FIG. 1 shows an exemplary annular heat exchanger according to one embodiment for a gas turbine engine.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, a "fluid" may be a gas or a liquid. The present approach is not limited by the types of fluids that are used. In the preferred application, the cooling fluid is fan air, and the cooled fluid is bleed air. However, the present approach may be used for other types of liquid and gaseous fluids, where the cooled fluid and the cooling fluid are the same fluids or different fluids. Other examples of the cooled fluid and the cooling fluid include air, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated or reduced temperature.

Heat exchangers are generally provided that include performance-enhancing geometries whose practical implementations are facilitated by additive manufacturing. Although the heat exchanger system described herein is broadly applicable to a variety of heat exchanger applications involving multiple fluid types, it is described herein for its high-effectiveness cooling of bleed air (e.g., the hot stream) with fan air (e.g., the cold stream) in a gas turbine engine. It should be noted that although the present description relates to heat exchangers that are used in high by-pass turbine engines, one of ordinary skill in the art would understand that the description is not limited to being used in high by-pass turbine engines. Rather, the provided heat exchangers may be used in any engine and/or apparatus requiring heat exchange. The heat exchangers are generally provided for a turbine engine that is coupled to at least one of a fan casing and an engine casing of the turbine engine. In an exemplary embodiment, the heat exchanger includes an annularly shaped body.

Referring to FIGS. 1-4, an annular jet engine air duct 10 is shown for a gas turbine engines, such as turbofan, turboprop, and turbojet engines. The annular jet engine air duct 10 includes an annular heat exchanger 12 formed from a first annular ring 14, a second annular ring 16, and a plurality of curvilinear plates 100 fluidly connecting the first annular ring 14 to the second annular ring 16. The first annular ring 14 has a first main tube 15 defined by a plurality of transduct segments 20 connected in series to each other such that at least a portion of adjacent transduct assemblies 20 are fluidly connected along the first main tube 15. Similarly, the second annular ring 16 has a second main tube 17 defined by a plurality of transduct segments 20. A curvilinear plate 100 defines at least one channel 110 that is in fluid communication with a transduct segment 20 of the first main tube 15 and a transduct segment 20 of the second main tube 17. The hot fluid (e.g., bleed air) can pass through the at least one channel 102 of the curvilinear plate 100 for heat transfer with a cooling fluid passing over the curvilinear plate 100. As shown, the curvilinear plate 100 defines a curved surface that is oriented radially inward. However, in alternative embodiments, the curvilinear plate 100 can define a curve that is oriented radially outward.

The plurality of curvilinear plates 100 are radially layered so as to define a gap between adjacent curvilinear plates 100 through which the cooling fluid (e.g., fan air) can flow in the axial direction. In one embodiment, the plurality of curvilinear plates 100 are generally oriented in a uniform manner circumferentially around the annular duct such that the cooling fluid flow is forced to impinge on the curvilinear plates 100 (for heat transfer therethrough) without finding any significant alternative path. Thus, most of the hot fluid flows through this heat transfer area of the annular duct (i.e., within the gaps defined between the inner band and the outer band with the radially layered plates therein). For example, at least 90% of the cooling fluid flows through the heat transfer area of the annular duct, such as at least 95% (e.g., at least 99%). As such, the capture rate of the cooling fluid flow is maximized to increase the efficiency of the heat transfer rate.

As shown, the first annular ring 14 is generally adjacent to and parallel with the second annular ring 16. However, in other embodiments, the first annular ring 14 and the second annular ring 16 can be shaped different from one another and/or oriented in nonparallel manner.

In the embodiment shown, each of the first main tube 15 of the first annular ring 14 and the second main tube 17 of the second annular ring 16 is partitioned into multiple, independent sections 22, 23, respectively. Each of the independent sections 22, 23 is formed from a plurality of transduct segments 20 forming individual cavities through the respective first main tube 15 and second main tube 17. The independent sections 22, 23 are separated at boundary walls 24 within the end transduct segment 20 of the multiple, independent sections 22, 23. Each transduct segment 20 spans, in particular embodiments, about 5° to about 20° of the circumferential length of the annular ring 14, 16. However, the transduct segment 20 can be formed to any desired length and/or shape.

Supply tubes 26 are shown within each section 22, 23 of the first main tube 15 and the second main tube 17, respectively, for supplying a fluid thereto. For example, the fluid can be compressed air for cooling (e.g., bleed air from the engine). In the embodiment shown, the supply fluid 30 (e.g., hot air) is introduced into the second annular ring 16 through the inlet supply tube 28, is passed from the second main tube 17 through a channel 110 of a curvilinear plate 100 (discussed below) into the first main tube 15, and exits through the outlet tube 32 as a cooled fluid 34. Specifically, a cooling fluid 36 (e.g., fan air) passes through the air duct 100 between the annular rings 14, 16 and the radially outer wall 40. It should be understood that the flow direction of either fluid can be changed as desired.

As discussed in greater detail below, the curvilinear plates 100 allow for thermal transfer between the hotter, higher pressure fluid therein and the cooler, lower pressure fluid passing through the duct. This heat transfer is enhanced by the geometries of the curvilinear plates 100, which have increased surface area available for heat transfer.

As more particularly shown in FIGS. 6-9, each transduct segment 20 generally includes a main tube 200 extending from a first end 202 to a second end 204 and defining a hollow passageway 206 therethrough. Adjacent transduct segments 20 are in fluid communication with each other along the main tube 200 through attachment at respective ends thereof. That is, the first end 202 of one transduct segment 20 is attached to the second end 204 of an adjacent transduct segment 20. As more particularly shown in FIG. 8, a male insert 240 is defined by the second end 204 and a female cavity is defined within the first end 202 to allow a male-female connection between adjacent transduct segments 20. However, any other suitable connection mechanism can be utilized (e.g., braze, weld, o-ring, bolts, etc.).

The main tube 200 also defines at least one aperture 208 that is in fluid communication with a supply channel 210 defined between a lower platform 212 attached to an outer surface 214 of the main tube 200 on first side 216 of the aperture 208 and an upper platform 218 attached to the outer surface 214 of the main tube 200 on second side 220 of the aperture 218 that is opposite of the first side 216. As such, the supply channel 210 is in fluid communication with the hollow passageway 206 of the main tube 200 through the aperture 208 defined by the main tube 200. A plurality of apertures 218 are shown defined in the main tube 200 with an elongated shape in the annular direction. That is, the apertures 218 may have a maximum length in an annular direction (i.e., that extends from the first end of the main tube to the second end of the main tube) that is greater than a maximum width in a perpendicular direction to the annular direction (i.e., the axial direction).

In the embodiment shown, the main tube 200 defines an ellipsoidal cross-section at both the first end 202 and the second end 204. For example, the ellipsoidal cross-section can have a maximum width that is about 1.5 times to about to about 20 times its maximum height. Such a ellipsoidal shape allows for minimal resistance to the cooling fluid (e.g., fan air) passing through the duct 100. However, the main tube can have other cross-sectional shapes, as desired.

In one embodiment, the upper platform 218 is integral with the lower platform 212 to define the supply channel 210 therebetween. Additionally, the upper platform 218 and the lower platform 212 can be integral with the main tube 200 so as to form a single unitary component. For example, the transduct segment 20 can be formed integrally together via additive manufacturing process, and may be formed from additive materials including but not limited to titanium, titanium alloys, aluminum, aluminum alloys, and austenite alloys such as nickel-chromium-based superalloys (e.g., those available under the name Inconel® available from Special Metals Corporation).

At its terminal end 221 (opposite of the aperture 208 at the main tube 200), the lower platform 212 and the upper platform 218 define an interface 222 defining a plurality of channels 224 in fluid communication with the hollow passageway 206 defined by the main tube 200. In one embodiment, a diverging angle θ is defined between an uppermost tangent line 226 extending from the second end 204 of the outer surface 214 of the main tube 200 and a tangent line 228 extending from the inner surface 213 of the lower platform 212, and wherein the diverging angle is about 10° to about 30°.

Figure 5:
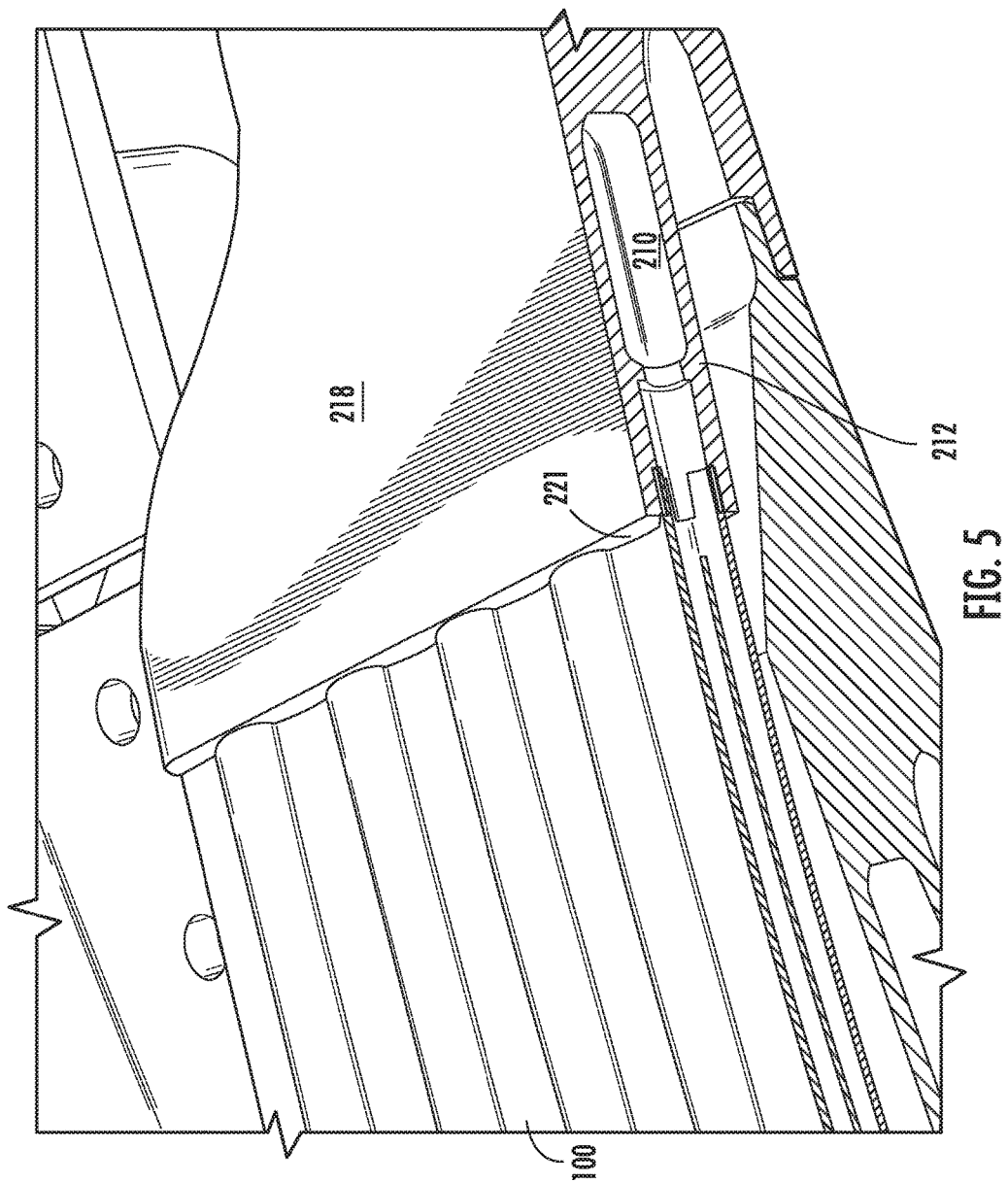
FIG. 5 shows a close-up view of an interface of a transduct segment attached to an end of a curvilinear plate.
Figure 6:
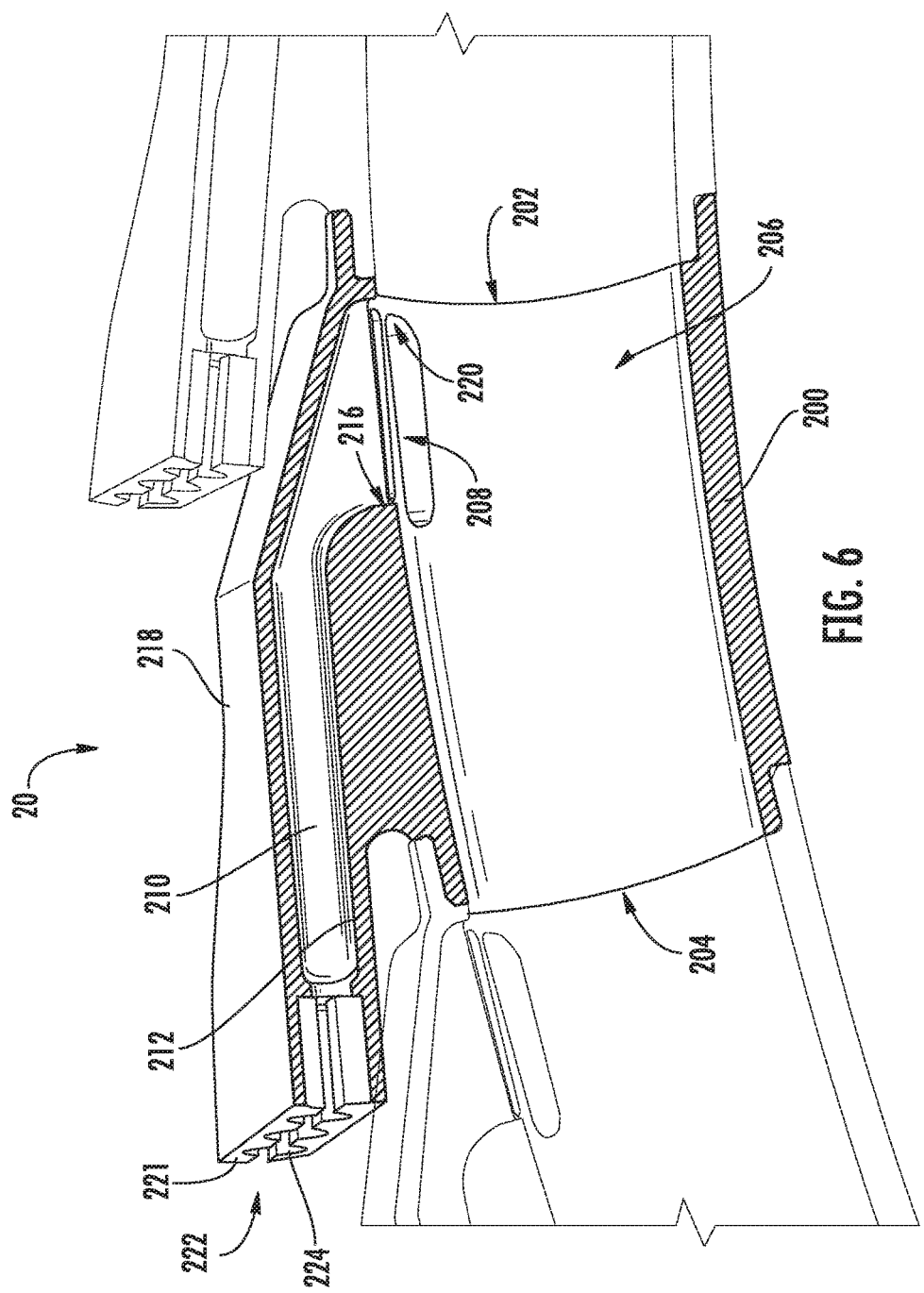
FIG. 6 shows a circumferential cross-sectional view of exemplary transduct segments that are fluidly connected along their main tube.
Figure 7:
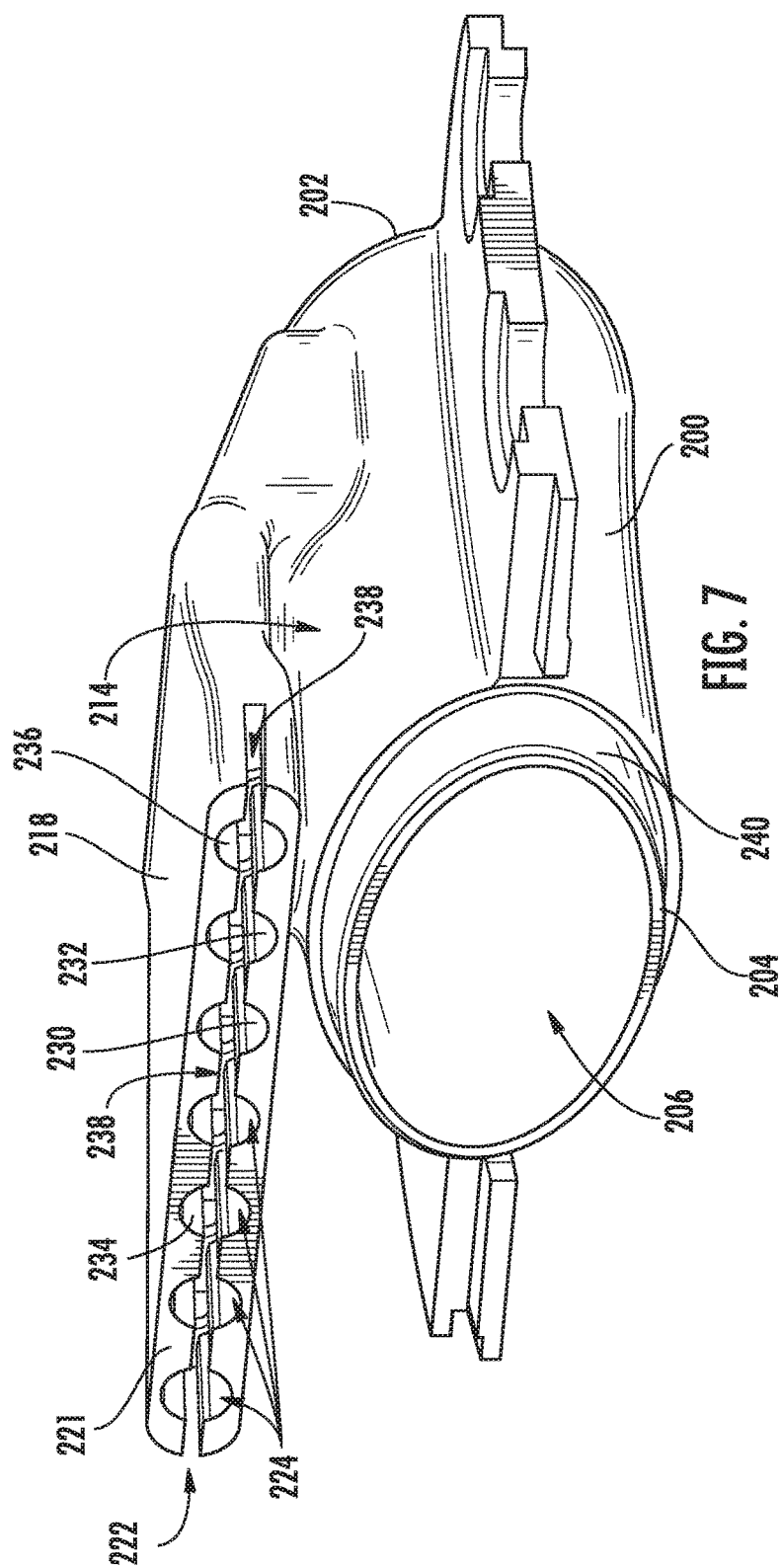
FIG. 7 shows an exemplary transduct segment defining a main tube and an interface.

In the embodiment shown, the inner surface 230 of the lower platform 212 defines a plurality of lower grooves 232 at the interface 222, and the inner surface 234 of the upper platform 218 defines a plurality of upper grooves 238 at the interface 222. The plurality of lower grooves 232 are generally aligned with the plurality upper grooves 236 to define the plurality of channels 224. Additionally, a slot 238 is defined between the inner surface 230 of the lower platform 212 and the inner surface 234 of the upper platform 218 at the interface 222. As shown, the slot 238 extends through the plurality of channels 224 defined between the upper platform 218 and the lower platform 212 so as to receive the first end 124 of the curvilinear plate 100 therein, as more particularly shown in FIG. 5. In one embodiment, the first end 124 of the curvilinear plate 100 is positioned and attached to the interface within the slot via a braze, a weld, or any other suitable attachment mechanism. In the embodiment shown, each channel 234 defined in the interface 222 of the transduct segment 200 is in fluid communication with a respective channel 110 of the curvilinear plate 100, as discussed in greater detail below.

Figure 8:
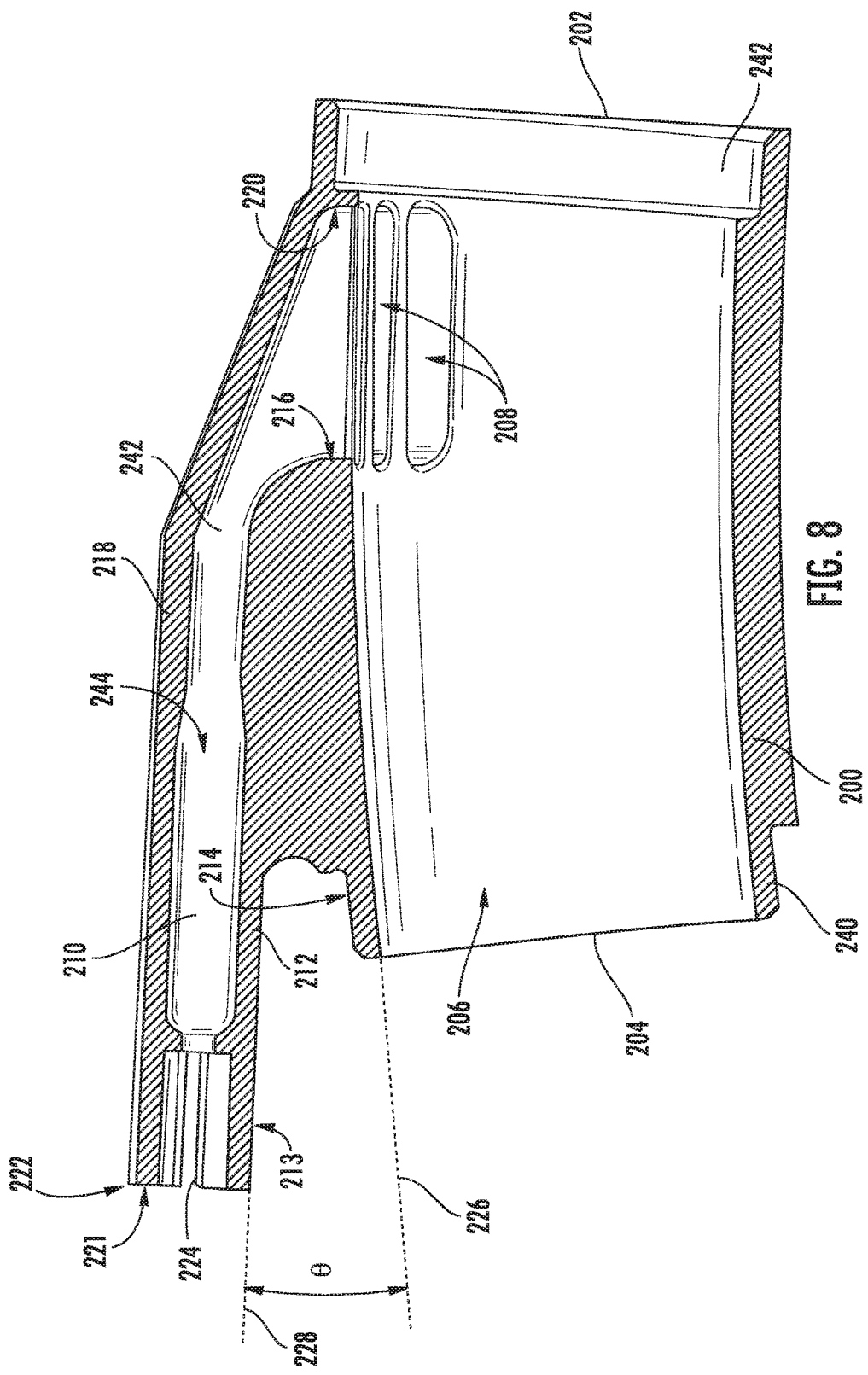
FIG. 8 shows a circumferential cross-sectional view of the exemplary transduct segment of FIG. 7.
Figure 9:
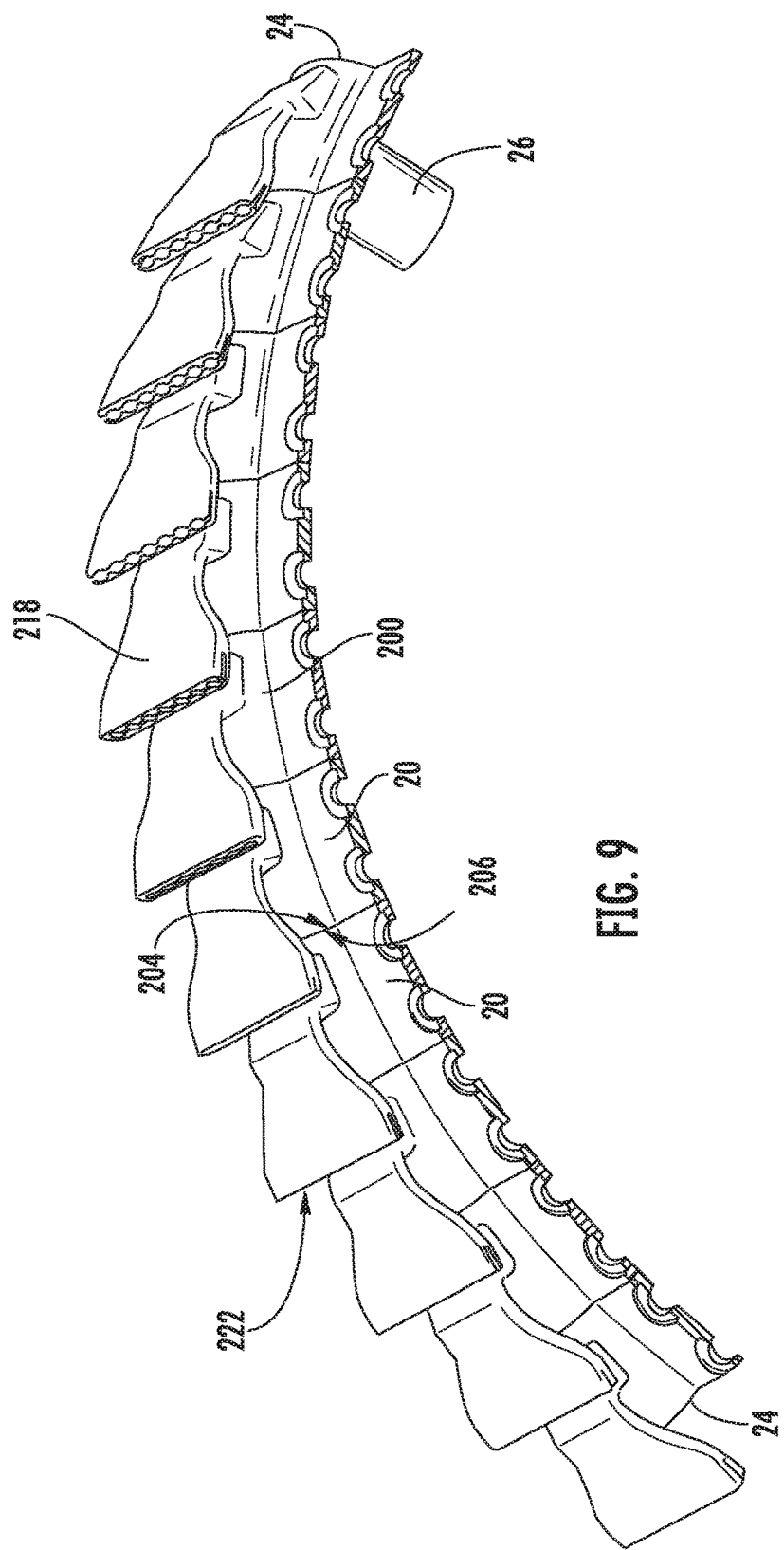
FIG. 9 shows a plurality of transduct segments as in FIG. 7, with adjacent transduct segments being fluidly connected along the main tube.

Referring to FIG. 8, an internal beam 242 may be present, as shown, and positioned between the upper platform 218 and the lower platform 212 and extending from the supply channel 210 to the interface 222 to define a plurality of passageways 244 corresponding to the respective channels 110 of the curvilinear plate 100 at the interface 222 such that each passageway 244 is in fluid communication with one of the channels 110. Additionally, the beams 242 can provide a structural support between the upper platform 218 and the lower platform 212. In one embodiment, the main tube 200 defines a plurality of apertures 208 that are in fluid communication with a respective passageway 244 and, therefore, are in fluid communication with a respective channel 110 of the curvilinear plate 100.

Figure 2:
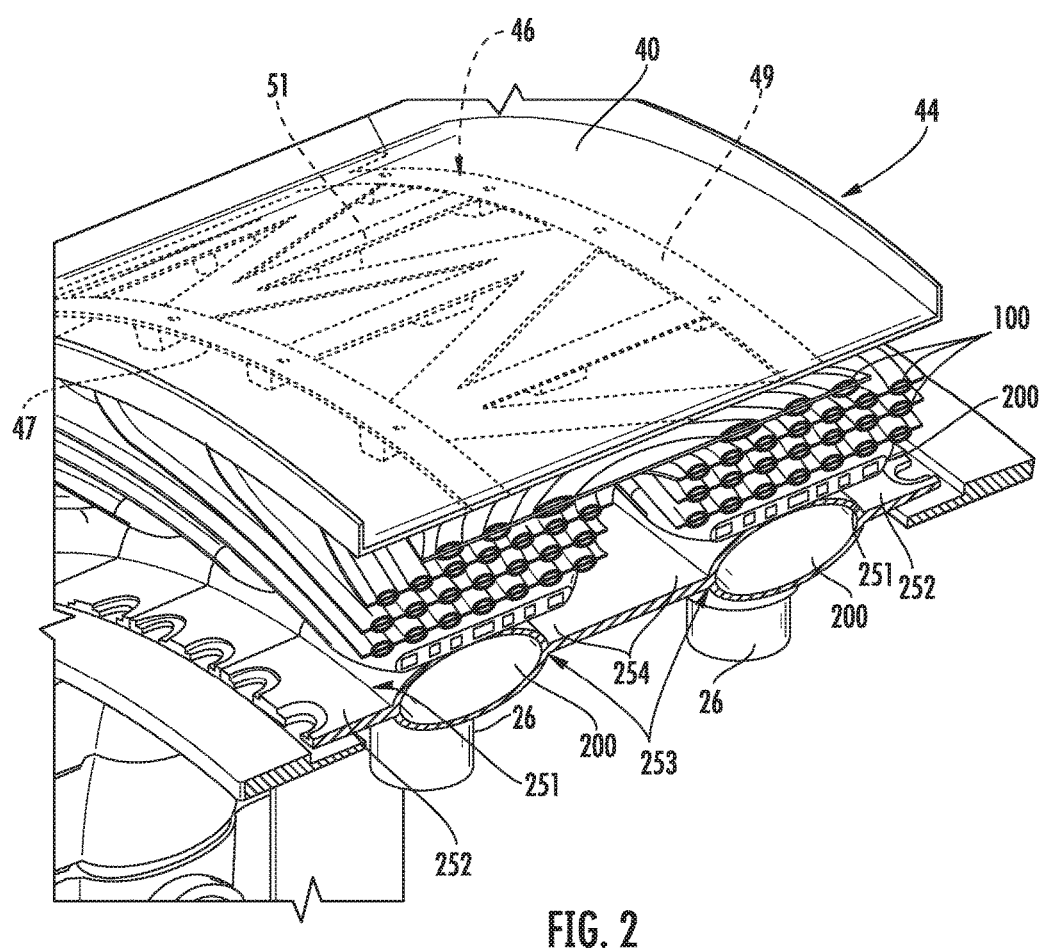
FIG. 2 shows a radial cross-sectional view of the exemplary annular heat exchanger of FIG. 1.
Figure 4:
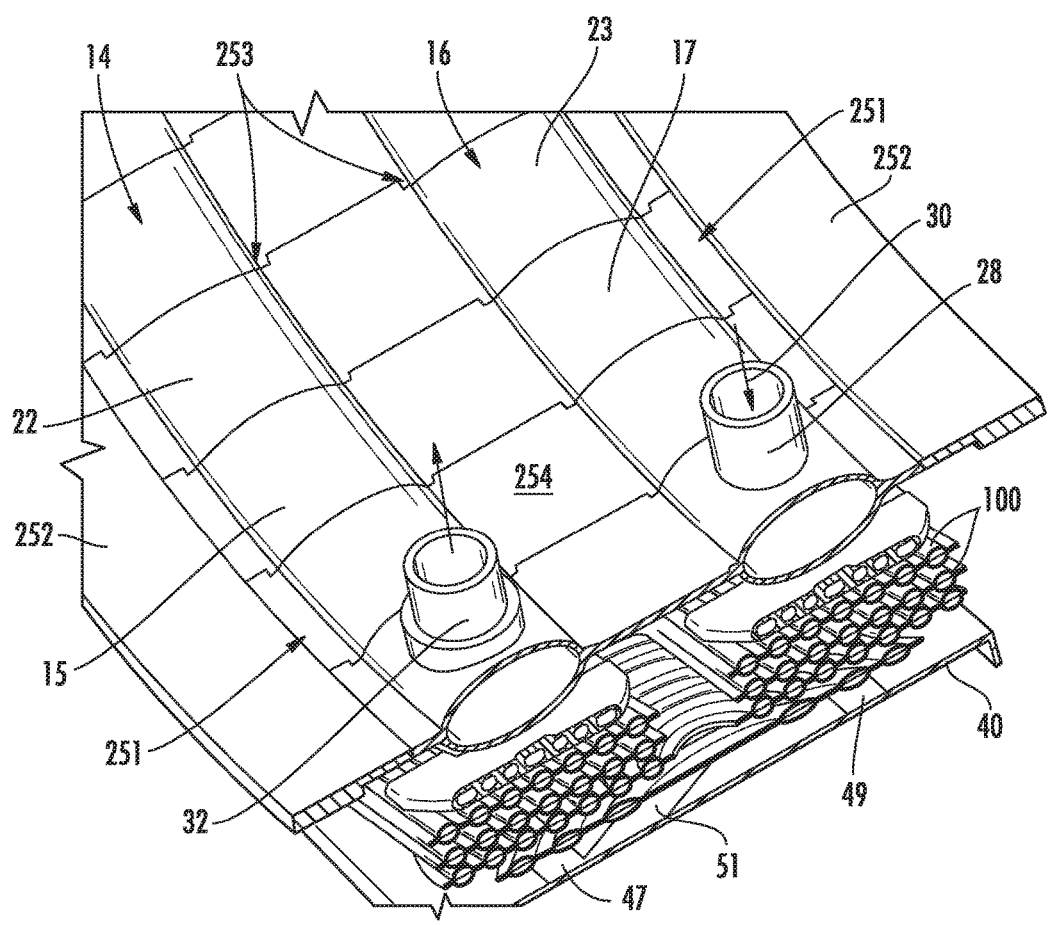
FIG. 4 shows the radial cross-sectional view of the exemplary annular heat exchanger of FIG. 2 from an inner view.

Referring to FIGS. 2 and 4, the transduct segment 20 may further include a first wing 252 extending from a first side 251 of the main tube 200 and configured for attachment to a frame of an engine (not shown). Also, the transduct segment may further include a second wing 254 extending from a second side 253 of the main tube 200 that is opposite from the first side 251 and configured for attachment to a wing 254 of an adjacent transduct segment 200. Thus, the first wing 252 and the second wing 254 extend in an axial direction of the maximum width of the ellipsoidal cross-section, and allow adjacent rings, 14, 16 to be connected together to form the annular heat exchanger 12. The second wings 254 of the adjacent transduct segments 20 may be integral to each other or connected to each other through an attachment mechanism (e.g., screw, bolt, weld, braze, etc.).

Figure 10:
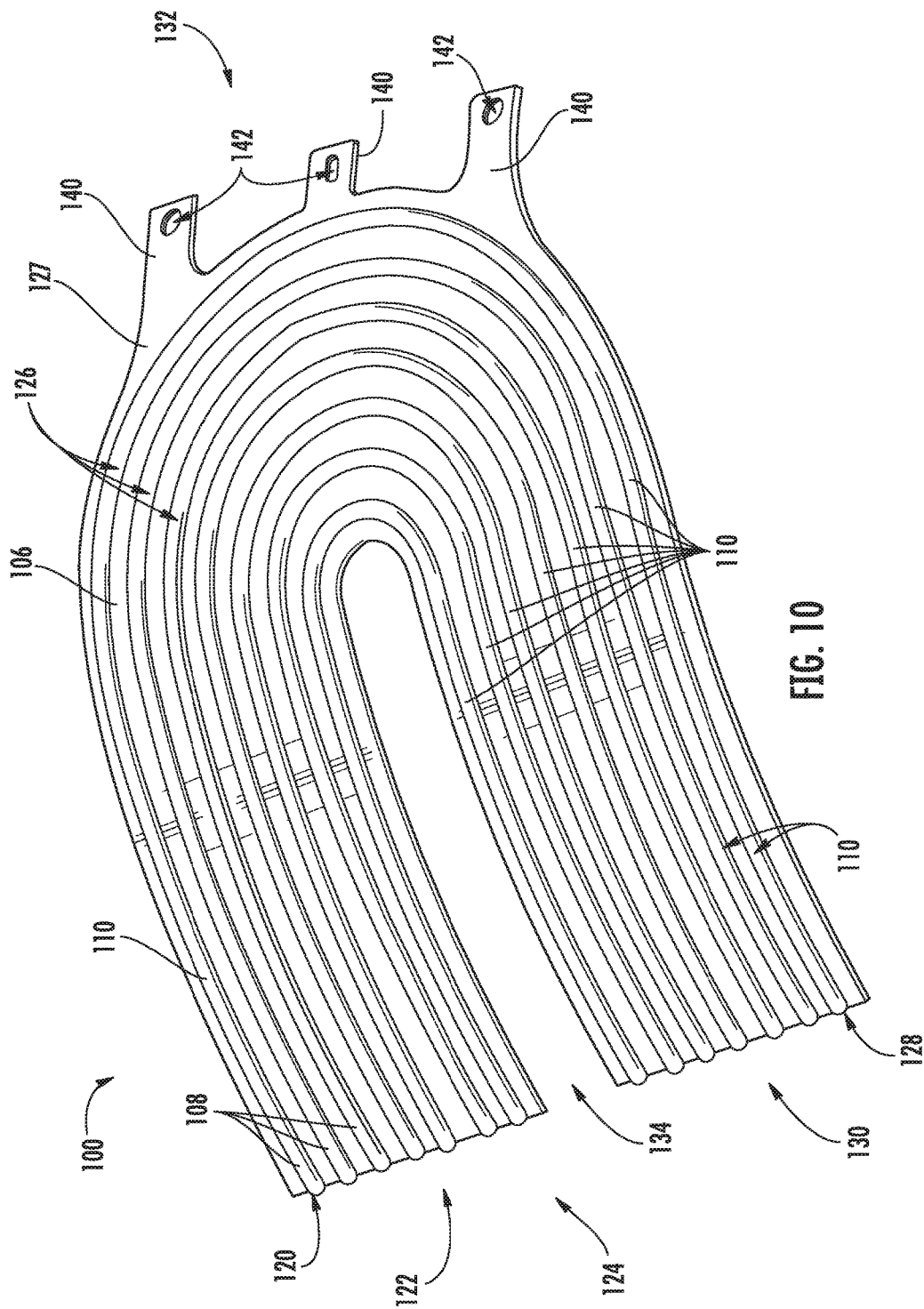
FIG. 10 shows an exemplary curvilinear plate defining a plurality of channels extending from a first opening on a first portion of a first end of the curvilinear plate, through a curve defined in each channel, and to a second opening on a second portion of the first end.
Figure 11:
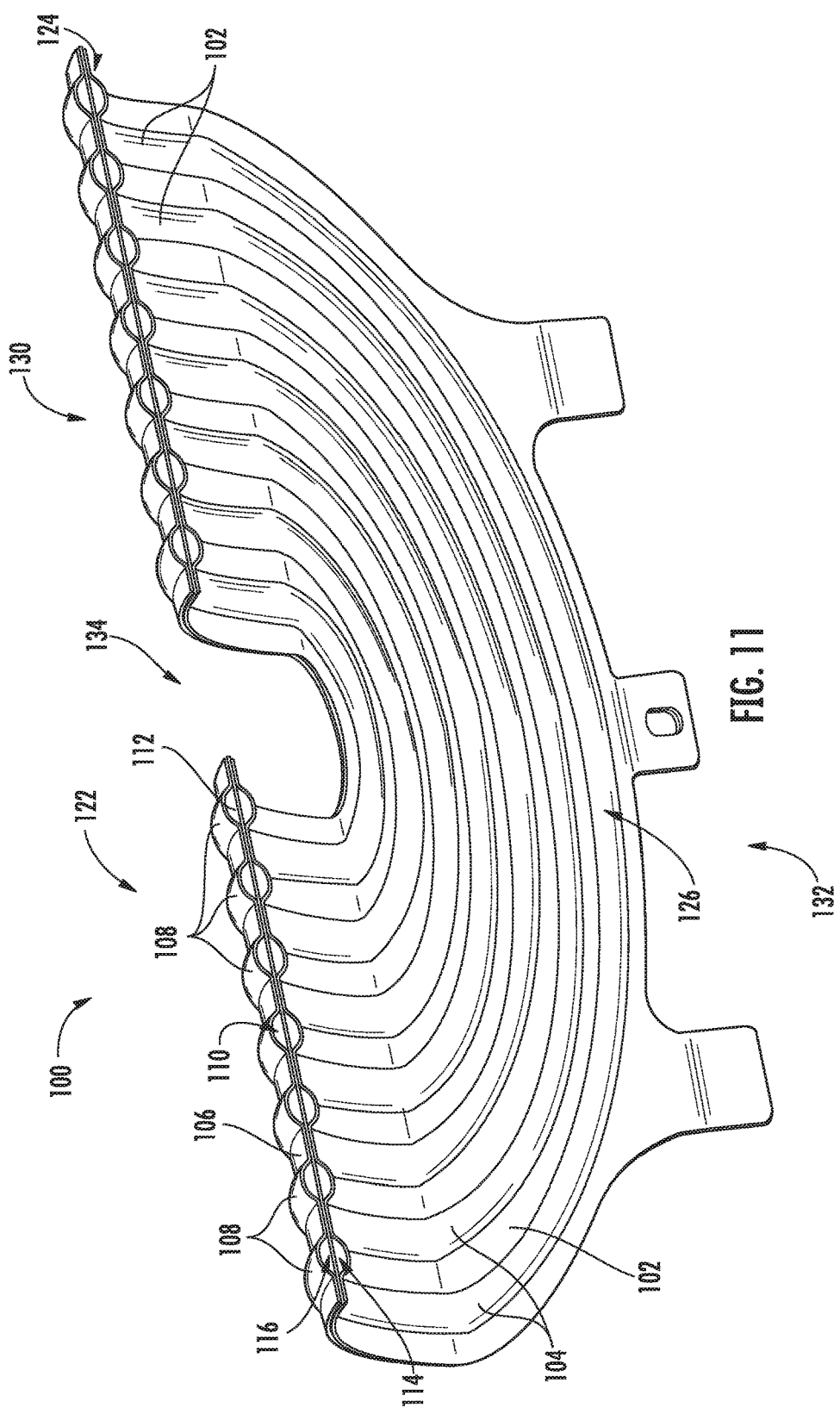
FIG. 11 shows another view of the exemplary curvilinear plate of FIG. 10.
Figure 12:
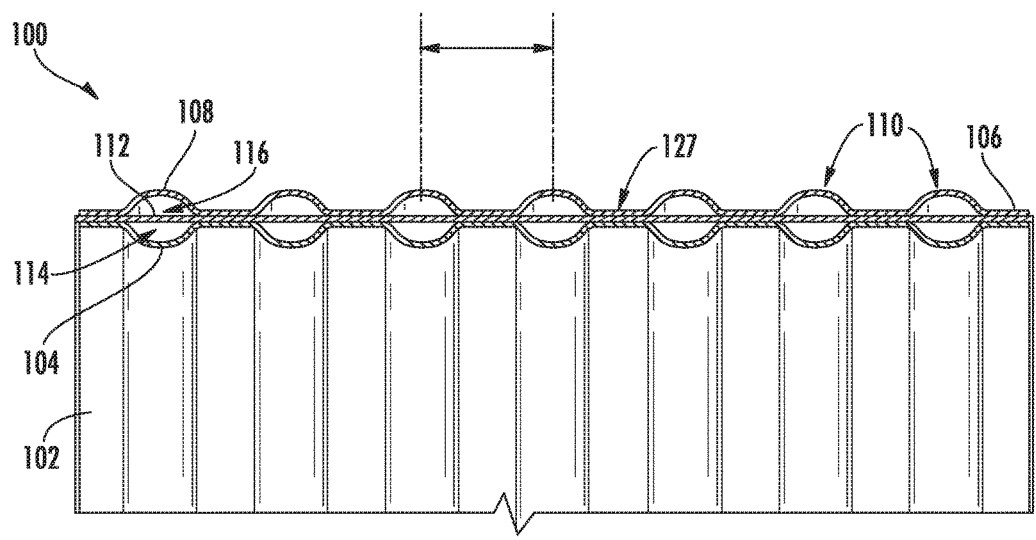
FIG. 12 shows a close-up view of one portion of the first end of the exemplary curvilinear plate of FIGS. 10 and 11.

FIGS. 10-12 show an exemplary curvilinear plate 100 that includes an inner plate 102 defining a plurality of first grooves 104 and an outer plate 106 defines a plurality of second grooves 108. Generally, the inner plate 102 is attached to the outer plate 106 with the plurality of first grooves 104 and the plurality of second grooves 108 substantially aligned to define a plurality of channels 110 therebetween. The embodiment of FIG. 11 includes an optional integral wall 112 positioned between the inner plate 102 and the outer plate 106 such that each channel 110 defines a first passageway 114 and a second passageway 116 therein.

In one embodiment, the inner plate 102 and the outer plate 106, along with the optional integral wall 112, are joined together via diffusion bonding without the presence of any braze or other weld. However, any suitable attachment can be utilized to join the inner plate 102 and the outer plate 106, including but not limited to adhesive bonding, welding, brazing, etc.

In the embodiment shown, each channel 112 extends from a first opening 120 on a first portion 122 of a first end 124 of the curvilinear plate 100, through a curve 126 defined in each channel 112, and to a second opening 128 on a second portion 130 of the first end 124. As such, a fluid passing through each channel 112 routes through the curvilinear plate from the first opening 120 of the first portion 122, around the curve 126, and out of the second opening 128 of the second portion 130 (or, vice versa, in the opposite direction from the second opening 128 to the first opening 120). Thus, each of the channels 112 define a nonlinear path having at least one curve 126 extending from the first opening 120 to the second opening 128.

FIG. 12 shows each of the first grooves 104 and the second grooves 108 having a substantially semi-ellipsoidal shape so as to define a substantially ellipsoidal channel 110. This shape not only allows for increased surface area within the channel 110 for heat transfer, but also allows the first grooves 104 and the second grooves 108 to be formed from a stamping process from a sheet (e.g., a metal sheet). In the embodiment shown, each of the first grooves 104 has a maximum cross-sectional arc length that is about 1.5 to about 20 times its maximum chord length. Similarly, each of the second grooves 108 has a maximum cross-sectional arc length that is about 1.5 to about 20 times its maximum chord length. However, other geometries can be utilized as desired.

In one embodiment, the first grooves 104 and/or the second grooves 108 can define a plurality of dimples or other surface features to agitate fluid flow within the channel 110 and to provide for increased surface area for thermal transfer.

The curvilinear plate 100 generally defines a curvature (i.e., non-planar) path from the first end 124 to the second end 132. In the embodiment shown, the curvature is generally constant to define an arc length of a circle. However, in other embodiments, the curvilinear plate 100 can have a non-uniform curvature (i.e., constant) that varies across the outer plate 126, and may include curves, bends, joints, planar portions, etc. No matter the particular cross-sectional shape, the outer plate 126 defines a chord length measured as a shortest distance from the first end 124 to the second end 132, and the outer plate 126 defines an arc length measured across its outer surface 127 from the first end 124 to a second end 132. Using the same starting and ending points (for the chord length and the arc length), the arc length is about 105% to about 150% of the chord length. That is, the arc length is about 1.05 times to about 1.5 times the chord length. As such, the curvature of the curvilinear plate 100 allows for more surface area for thermal transfer than would otherwise be present with a planar plate.

In the embodiment shown in FIGS. 10 and 11, a slot 134 is defined in the curvilinear plate 100 in the first end 124 between the first portion 122 and the second portion 130. Generally, the slot 134 allows for flexing of the curvilinear plate 100 between the first portion 122 and the second portion 130, which are attached to respective interfaces 222 of the transduct 200. Although shown having a substantially U-shape, the slot 134 can have any geometry desired. Similarly, each channel 110 is shown extending in a substantially U-shape from the first opening 120 on the first portion 122 of the first end 124, around the slot 134 defined in the curvilinear plate 100, and to the second opening 128 on the second portion 130 of the first end 124. However, the channels 110 can take any desired path within the curvilinear plate 100.

The inner plate 102 and the outer plate 106 can be formed from any suitable material having the desired thermal transfer properties. For example, the inner plate 102 and the outer plate 106 can be constructed from titanium, titanium alloys, aluminum, aluminum alloys, and austenite alloys such as nickel-chromium-based superalloys (e.g., those available under the name Inconel® available from Special Metals Corporation).

Likewise, the integral wall 112 can be made of any suitable material, when present. In one embodiment, the integral wall 112 is made from a relatively high thermally conductive material so as to facilitate thermal transfer between the first passageway 114 and the second passageway 116 within a channel 110. For example, the integral wall can be made of plated copper, titanium, titanium alloys, aluminum, aluminum alloys, and austenite alloys such as nickel-chromium-based superalloys (e.g., those available under the name Inconel® available from Special Metals Corporation). In most embodiments, the inner plate 102 and the outer plate 106 have a substantially equal thickness across each respective surface, although the grooves 104, 108, respectively may be slightly thinner than the flatter portion. In most embodiments, the inner plate 102 and the outer plate 106 have a thickness that is about 400 µm to about 800 µm, independently. The integral wall 112, when present, can have a thickness that is about 400 µm to about 800 µm.

The integral wall 112 can, in certain embodiments, define a plurality of holes (e.g., slots or other apertures) to allow fluid flow between the first passageway 114 and the second passageway 116 within a channel 110. Alternatively or additionally, the integral wall 112 can define a plurality of dimples or other surface features to agitate fluid flow within the first passageway 114 and the second passageway 116 within a channel 110 and to provide for increased surface area for thermal transfer therebetween.

Figure 3:
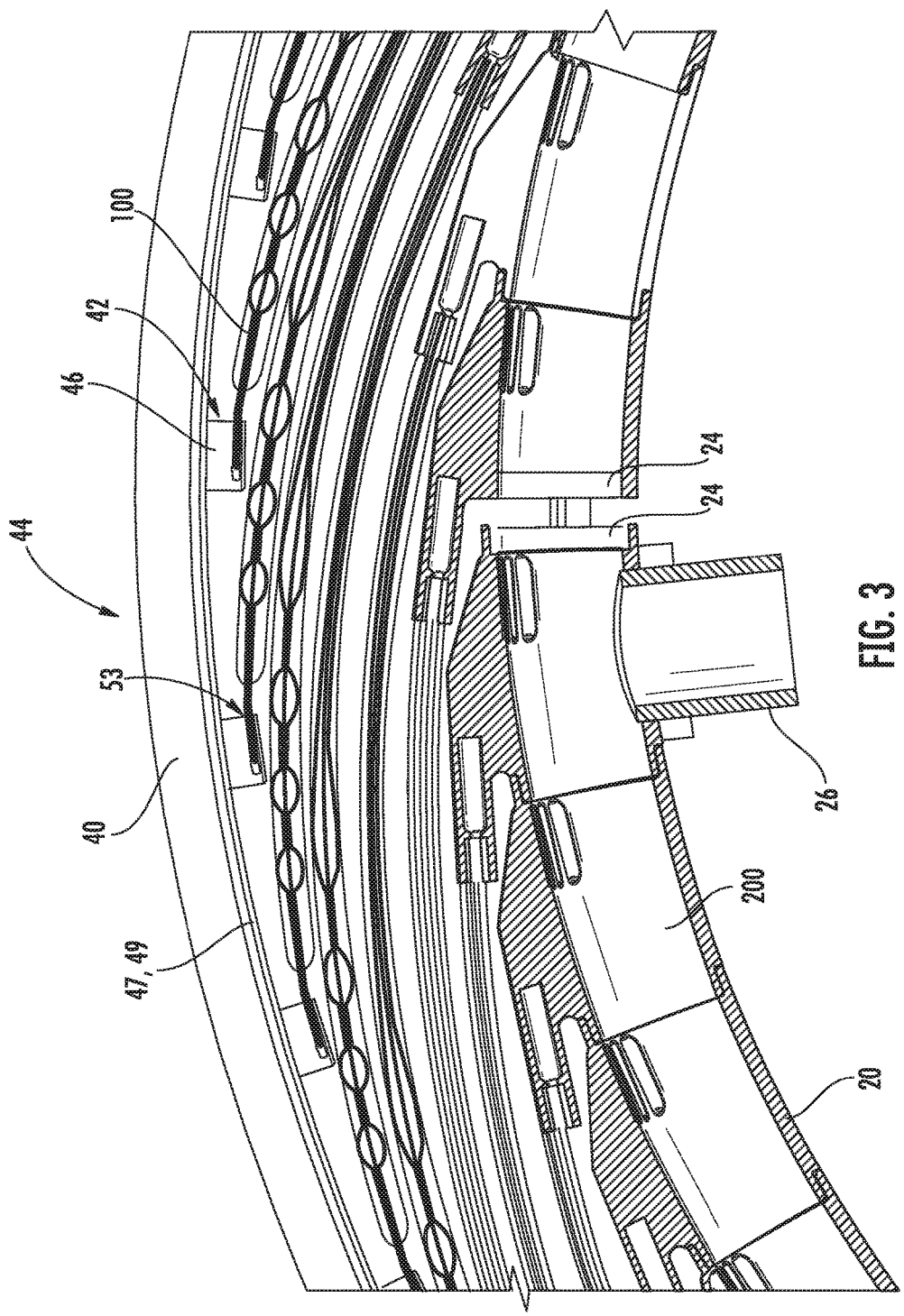
FIG. 3 shows a circumferential cross-sectional view of the exemplary annular heat exchanger of FIG. 1.

As shown in FIGS. 10 and 11, at least one of the inner plate 102 and the outer plate 106 (or both) comprises at least one tab 140 extending from the second end 132 that is opposite of the first end 124. Referring to FIG. 3, the tab(s) 140 extend into a slot 42 defined within a casing 44 of the annular heat exchanger 12. The casing 44 generally includes a structural support 46 and the radial outer wall 40. As such, each curvilinear plate 100 is supported structurally so that thermal expansion of each curvilinear plate 100 relative to the annular duct is unrestrained in at least one direction. That is, each curvilinear plate 100 may be attached only at the first and second portions 122, 130 of the first end 124 to allow thermal expansion along the length of the curvilinear plate 100 extending away from the respective transduct segment 20, while also allowing flexing in the axial direction due to the slot therebetween. The tab 140 allows for slight movement and/or expansion while remaining generally in place without restricting such movement and/or expansion.

In the embodiment shown, the structural support 46 includes a first annular ring 47, a second annular ring 49 parallel to the first annular ring 47, and a plurality of crossbars 51 connecting the first annular ring 47 to the second annular ring 49. The crossbars 51 can define a cavity 53 for receiving at least one the tabs 140.

In the embodiment shown, at least one of the tabs 140 defines an aperture 142 for receiving an attachment piece (not shown) therethrough so as to secure the second end 132 to the structural support 46 through an attachment piece (e.g., a bolt, screw, pin, or other attachment member). In some embodiments, at least one of the tabs 140 can be slideably positioned within a respective slot 42 defined within the structural support 46 of the casing 44. For example, the attachment piece can secure the tab 140 within the slot 42 while allowing for some movement therein (e.g., an elongated aperture can allow for movement in the longer direction of the aperture). For example, a combination of slideably positioned tabs 140 and secured tabs 140 can be utilized to allow for flexing and/or slight movement of the second end 132 of the curvilinear plate 100, while substantially keeping it in position. Thus, the curvilinear plate 100 can move in relation to the casing, allowing for thermal expansion, flexing, vibrational movement, or other slight movements in use. It is noted that FIG. 10 shows an embodiment where each tab 140 defines an aperture 142 for receiving an attachment piece therethrough, while the embodiment of FIG. 11 shows only the center tab 140 defining an aperture 142 with the outer tabs 142 being configured for slot positioning without any securing attachment piece.

As stated, the curvilinear plate 100 can be formed via a stamping process. In one embodiment, the curvilinear plate 100 can be formed by stamping a first sheet of metal to form a first plate defining a plurality of first grooves; stamping a second sheet of metal to form a second plate defining a plurality of second grooves; and thereafter, laminating the first sheet to the second sheet to form the curvilinear plate such that the plurality of first grooves and the plurality of second grooves substantially aligned to define a plurality of channels therebetween. In one embodiment, prior to laminating, an integral wall can be positioned between the first sheet and the second sheet such that each channel defines a first passageway and a second passageway therein.

In one embodiment, the annular duct is used in a method of cooling a hot fluid of a gas turbine engine. The directing the hot fluid through a plurality of cooling channels that are radially layered within the annular duct to define a heat transfer area; and passing a cooling fluid through the annular duct such that the cooling fluid passes between the radially layered cooling channels. For example, the cooling fluid generally flows through the annular duct in an axial direction of the gas turbine engine.

Figure 13:
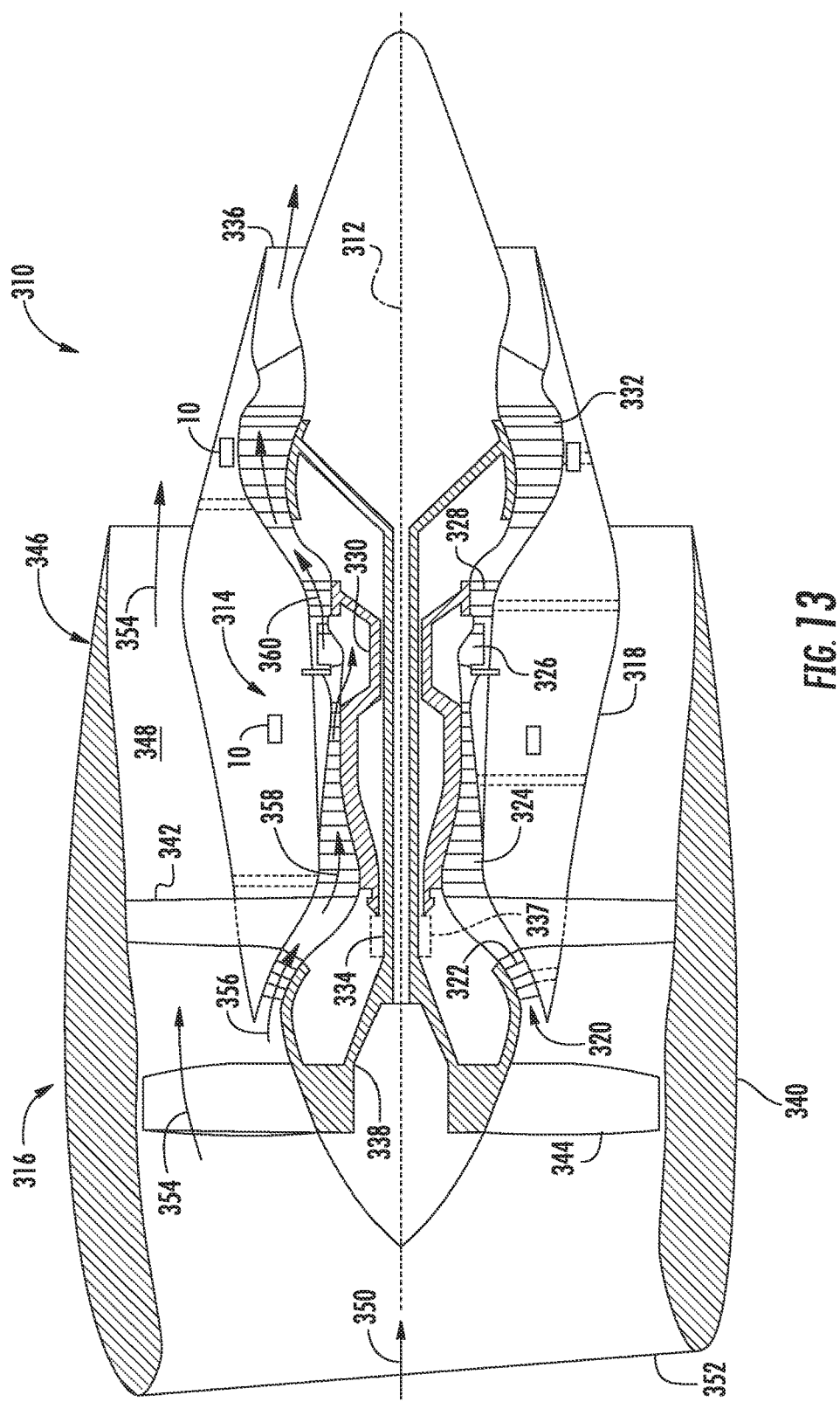
FIG. 13 shows a cross-sectional view of one embodiment of a gas turbine engine that may include an exemplary annular heat exchanger according to one embodiment.

For example, FIG. 13 illustrates a cross-sectional view of one embodiment of a gas turbine engine 310 including one or more annular heat exchangers 10. The position of the annular heat exchanger(s) may be varied as desired, but is in particular embodiments within the core engine 314. For instance, the annular heat exchanger can utilize fan air 354 as the cooling fluid (either directly or routed into the annular duct), and the hot fluid can be bleed air from the core of the gas turbine engine. The gas turbine engine may be utilized within an aircraft in accordance with aspects of the present subject matter, with the engine 310 being shown having a longitudinal or axial centerline axis 312 extending therethrough for reference purposes.

In general, the engine 310 may include a core gas turbine engine (indicated generally by reference character 314) and a fan section 316 positioned upstream thereof. The core engine 314 may generally include a substantially tubular outer casing 318 that defines an annular inlet 320. In addition, the outer casing 318 may further enclose and support a booster compressor 322 for increasing the pressure of the air that enters the core engine 314 to a first pressure level. A high pressure, multi-stage, axial-flow compressor 324 may then receive the pressurized air from the booster compressor 322 and further increase the pressure of such air. The pressurized air exiting the high-pressure compressor 324 may then flow to a combustor 326 within which fuel is injected into the flow of pressurized air, with the resulting mixture being combusted within the combustor 326. The high energy combustion products are directed from the combustor 326 along the hot gas path of the engine 310 to a first (high pressure) turbine 328 for driving the high pressure compressor 324 via a first (high pressure) drive shaft 30, and then to a second (low pressure) turbine 332 for driving the booster compressor 322 and fan section 316 via a second (low pressure) drive shaft 334 that is generally coaxial with first drive shaft 330. After driving each of turbines 328 and 332, the combustion products may be expelled from the core engine 314 via an exhaust nozzle 336 to provide propulsive jet thrust.

It should be appreciated that each compressor 322, 324 may include a plurality of compressor stages, with each stage including both an annular array of stationary compressor vanes and an annular array of rotating compressor blades positioned immediately downstream of the compressor vanes. Similarly, each turbine 328, 332 may include a plurality of turbine stages, with each stage including both an annular array of stationary nozzle vanes and an annular array of rotating turbine blades positioned immediately downstream of the nozzle vanes.

Additionally, as shown in FIG. 13, the fan section 316 of the engine 310 may generally include a rotatable, axial-flow fan rotor assembly 338 that is configured to be surrounded by an annular fan casing 340. It should be appreciated by those of ordinary skill in the art that the fan casing 340 may be configured to be supported relative to the core engine 314 by a plurality of substantially radially-extending, circumferentially-spaced outlet guide vanes 342. As such, the fan casing 340 may enclose the fan rotor assembly 338 and its corresponding fan rotor blades 344. Moreover, a downstream section 346 of the fan casing 340 may extend over an outer portion of the core engine 314 so as to define a secondary, or by-pass, airflow conduit 48 that provides additional propulsive jet thrust.

It should be appreciated that, in several embodiments, the second (low pressure) drive shaft 334 may be directly coupled to the fan rotor assembly 338 to provide a direct-drive configuration. Alternatively, the second drive shaft 334 may be coupled to the fan rotor assembly 338 via a speed reduction device 337 (e.g., a reduction gear or gearbox) to provide an indirect-drive or geared drive configuration. Such a speed reduction device(s) may also be provided between any other suitable shafts and/or spools within the engine 310 as desired or required.

During operation of the engine 310, it should be appreciated that an initial air flow (indicated by arrow 350) may enter the engine 310 through an associated inlet 352 of the fan casing 340. The air flow 350 then passes through the fan blades 344 and splits into a first compressed air flow (indicated by arrow 354) that moves through conduit 348 and a second compressed air flow (indicated by arrow 356) which enters the booster compressor 322. The pressure of the second compressed air flow 356 is then increased and enters the high pressure compressor 324 (as indicated by arrow 358). After mixing with fuel and being combusted within the combustor 326, the combustion products 360 exit the combustor 326 and flow through the first turbine 328. Thereafter, the combustion products 360 flow through the second turbine 332 and exit the exhaust nozzle 336 to provide thrust for the engine 310.

As stated, a hot fluid (e.g., bleed air) can be cooled in the annular duct of a gas turbine engine through the presently described apparatus and methods. In one embodiment, the hot fluid can be directed through a plurality of cooling channels that are radially layered within the annular duct to define a heat transfer area (e.g., defined within a plurality of layered curvilinear plates as described above), and a cooling fluid can be passed through the annular duct such that the cooling fluid passes between the radially layered cooling channels.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An annular heat exchanger for a gas turbine engine, comprising:
 a first annular ring comprising a first main tube defined by a plurality of transduct segments;
 a second annular ring comprising a second main tube defined by a plurality of transduct segments, wherein each transduct segment of the first main tube and the second main tube comprises:
  a main tube extending from a first end to a second end and defining a hollow passageway therethrough, and wherein the main tube defines an aperture, and further wherein at least a portion of adjacent transduct segments are fluidly connected along the main tube;
  a lower platform attached to an outer surface of the main tube on a first side of the aperture; and
  an upper platform attached to the outer surface of the main tube on a second side of the aperture that is opposite of the first side, wherein the upper platform is integral with the lower platform to define a supply channel therebetween, the supply channel being in fluid communication with the hollow passageway of the main tube through the aperture defined by the main tube, and wherein the lower platform and the upper platform define an interface defining a plurality of channels in fluid communication with the hollow passageway defined by the main tube; and
 at least one curvilinear plate, each defining at least one channel therein, wherein the at least one channel of the at least one curvilinear plate is in fluid communication with a transduct segment of the first main tube and a transduct segment of the second main tube.

2. The annular heat exchanger of claim 1, wherein the curvilinear plate defines a chord length measured as a shortest distance from a first end to a second end, and wherein the curvilinear plate defines an arc length measured across an outer surface of the curvilinear plate from the first end to the second end, and further wherein the arc length is about 105% to about 150% of the chord length.

3. The annular heat exchanger of claim 2, wherein the curvilinear plate defines a curve that is oriented radially inward.

4. The annular heat exchanger of claim 2, wherein the curvilinear plate defines a curve that is oriented radially outward.

5. The annular heat exchanger of claim 1, wherein the curvilinear plate comprises:
 an inner plate defining a plurality of first grooves; and
 an outer plate defining a plurality of second grooves, wherein the outer plate is attached to the inner plate with the plurality of first grooves and the plurality of second grooves substantially aligned to define a plurality of channels therebetween, and wherein each channel extends from a first opening on a first portion of a first end of the curvilinear plate and is in fluid communication with the transduct segment of the first main tube through a curve defined in each channel, and to a second opening on a second portion of the first end and is in fluid communication with the transduct segment of the second main tube.

6. The annular heat exchanger of claim 5, wherein a slot is defined in the curvilinear plate in the first end between the first portion and the second portion.

7. The annular heat exchanger of claim 5, further comprising:

an integral wall positioned between the inner plate and the outer plate such that each channel defines a first passageway and a second passageway therein.

8. The annular heat exchanger of claim 5, wherein the curvilinear plate comprises at least one tab extending from a second end of the curvilinear plate that is opposite from the first end.

9. The annular heat exchanger of claim 8, further comprising:
a support structure coupled to the at least one tab of the curvilinear plate.

10. The annular heat exchanger of claim 9, wherein the support structure is slideably attached to the at least one tab of the curvilinear plate so as to allow for movement in an axial direction.

11. The annular heat exchanger of claim 9, wherein the support structure comprises:
a first annular ring;
a second annular ring parallel to the first annular ring; and
a plurality of crossbars connecting the first annular ring to the second annular ring.

12. The annular heat exchanger of claim 1, wherein the first main tube of the first annular ring is partitioned into multiple segments, and wherein the second main tube of the second annular ring is partitioned into multiple segments.

13. The annular heat exchanger of claim 12, further comprising:
an inlet defined in each segment of the first main tube of the first annular ring; and
an outlet defined in each segment of the second main tube of the second annular ring.

14. The annular heat exchanger of claim 1, wherein an inner surface of the lower platform defines a plurality of lower grooves at the interface, and wherein an inner surface of the upper platform defines a plurality of upper grooves at the interface that are aligned with the plurality upper grooves to define the plurality of channels, and further wherein the each channel defined at the interface by the lower platform and the upper platform is aligned with a channel of the curvilinear plate so as to be in fluid communication therewith.

15. The annular heat exchanger of claim 14, wherein a slot is defined within the interface between the lower platform and the upper platform and extends through the plurality of channels, and wherein a first end of the curvilinear plate is positioned within the slot.

16. The annular heat exchanger of claim 15, wherein the curvilinear plate is attached to the interface within the slot via a braze.

17. The annular heat exchanger for a gas turbine engine of claim 1, comprising:
a plurality of the curvilinear plates, with each curvilinear plate being in fluid communication with a respective transduct segment of the first main tube and a respective transduct segment of the second main tube, wherein the plurality of curvilinear plates are radially layered extending away from the first annular ring and the second annular ring.

18. The annular heat exchanger of claim 1, wherein the first annular ring is substantially parallel to the second annular ring.

19. The annular heat exchanger of claim 17, wherein a plurality of gaps are defined between adjacently layered curvilinear plates for receiving a flow of a cooling fluid therethrough in an axial direction of the gas turbine engine.

* * * * *